United States Patent
Slavicek et al.

(10) Patent No.: US 10,235,434 B2
(45) Date of Patent: Mar. 19, 2019

(54) OPTIMIZING LOADING OF RELATIONAL DATA FOR APPLICATIONS

(71) Applicant: Red Hat, Inc., Raleigh, NC (US)

(72) Inventors: Pavel Slavicek, Brno (CZ); Rostislav Svoboda, Slapanice (CZ)

(73) Assignee: Red Hat, Inc., Raleigh, NC (US)

( * ) Notice: Subject to any disclaimer, the term of this patent is extended or adjusted under 35 U.S.C. 154(b) by 262 days.

(21) Appl. No.: 14/445,733

(22) Filed: Jul. 29, 2014

(65) Prior Publication Data

US 2016/0034546 A1    Feb. 4, 2016

(51) Int. Cl.
  *G06F 17/30* (2006.01)
  *G06F 9/455* (2018.01)
  *G06F 15/16* (2006.01)

(52) U.S. Cl.
  CPC .... *G06F 17/30557* (2013.01); *G06F 9/45504* (2013.01)

(58) Field of Classification Search
  CPC .......... G06F 17/30557; G06F 9/45504
  See application file for complete search history.

(56) References Cited

U.S. PATENT DOCUMENTS

| | | | |
|---|---|---|---|
| 6,714,928 B1 | 3/2004 | Calow | |
| 7,702,686 B2 * | 4/2010 | Meijer | G06F 17/30607 707/763 |
| 7,836,458 B1 * | 11/2010 | Gwozdz | H04L 67/10 709/221 |
| 8,112,755 B2 * | 2/2012 | Apacible | G06F 9/4843 718/104 |
| 8,260,824 B2 | 9/2012 | Mao et al. | |
| 9,349,123 B1 * | 5/2016 | McNamara | H04L 67/10 |

(Continued)

FOREIGN PATENT DOCUMENTS

| | | |
|---|---|---|
| WO | 2003030020 | 4/2003 |
| WO | 2004044785 | 5/2004 |

OTHER PUBLICATIONS

Optimizing Fetching and Caching (Hibernate), http://what-when-how.com/hibernate/optimizing-fetching-and-caching-hibernate/.

(Continued)

*Primary Examiner* — Usmaan Saeed
*Assistant Examiner* — Brian E. Weinrich
(74) *Attorney, Agent, or Firm* — Lowenstein Sandler LLP

(57) ABSTRACT

A method for optimizing loading of relational data for applications is disclosed. The method includes monitoring a plurality of requests selecting entities and processes to be executed for the selected entities. The plurality of requests is generated in an application server. The method also includes associating an application context with each of the processes to be executed for the selected entities. The application context includes the process to be executed using an entity stored in a database external to the application server. The method further includes generating a fetch plan for the entity stored in the database and modifying, the generated fetch plan in view of the selected entities and the associated application context. The fetch plan may include lazy loading of the entity stored in the database (e.g., by loading the entity from the database and deferring loading of one or more attributes of the entity form the database).

20 Claims, 4 Drawing Sheets

(56) References Cited

U.S. PATENT DOCUMENTS

| | | | |
|---|---|---|---|
| 2005/0268305 A1* | 12/2005 | Hostetter | G06F 9/44521 719/313 |
| 2009/0077120 A1* | 3/2009 | Warrren | G06F 17/30607 707/999.103 |
| 2010/0037204 A1* | 2/2010 | Lin | G06F 8/20 717/106 |
| 2010/0082538 A1* | 4/2010 | Rentsch | G06F 17/30457 707/616 |
| 2010/0211939 A1 | 8/2010 | Ali | |
| 2011/0167402 A1* | 7/2011 | Ahmad | G06F 17/30604 707/802 |
| 2011/0270857 A1* | 11/2011 | Bommireddipalli | G06F 17/30306 707/758 |
| 2011/0310129 A1* | 12/2011 | Nakahara | G06F 9/4443 345/672 |
| 2012/0054227 A1* | 3/2012 | Briggs | G06F 17/30595 707/769 |
| 2012/0123984 A1* | 5/2012 | Nagpal | G06F 17/30607 706/21 |
| 2013/0036381 A1* | 2/2013 | Joshi | G06F 17/30867 715/808 |
| 2015/0088970 A1* | 3/2015 | Wei | H04L 67/10 709/203 |

OTHER PUBLICATIONS

Java Persistence Performance, http://java-persistence-performance.blogspot.in/2011/06/how-to-improve-jpa-performance-by-1825.html.

Fetching Arbitrary Object Graphs in JPA 2, http://jdevelopment.nl/fetching-arbitrary-object-graphs-jpa-2/.

Java EE 6: Develop Database Applications with JPA New, http://www.exitcertified.com/training/oracle/java/enterprise/6-develop-database-application-jpa-19983-detail.html.

Optimize Spring-Data JPA queries, http://stackoverflow.com/questions/20120619/optimize-spring-data-jpa-queries.

* cited by examiner

OPTIMIZING LOADING OF RELATIONAL DATA FOR APPLICATIONS

TECHNICAL FIELD

The embodiments of the invention relate generally to a computer system and, more specifically, relate to systems and methods for optimizing loading of relational data for applications.

BACKGROUND

Data models and databases are fundamental strengths of current enterprise systems. An important aspect for overall system performance is design of the data model and method of data loading. Java™ ™-based enterprise systems usually use Java™ persistence application programming interface (API), which is often referred to as JPA. JPA is a Java™ programming language application interface specification, which describes management of relational data in applications using the Java™ platform. Such relational data includes, but is not limited to, an entity, which is a single person, place, or thing about which data can be stored. Specifically, in data modeling, the entity is a unit of the data that is classified and has relationships to other entities.

JPA offers two strategies to load relational data into a Java™ application. One of these strategies is "eager loading", which is a requirement on a persistence provider runtime that one or more entities be eagerly fetched. Persistence provider is a concrete implementation of JPA used by business application. In eager loading, an attribute of the one or more entities are fetched explicitly in a database without utilizing pointers to the one or more fetched entities. Accordingly, the persistence provider manages eager loading of related entities during runtime without requiring any interaction by a user.

The other strategy is "lazy loading", which is a hint to the persistence provider runtime that the one or more entities can be fetched lazily in a database when the one or more entities are accessed for the first time. Lazy loading is commonly used to defer the loading of the attribute of the one or more entities until the point at which the one or more entities are desired. However, lazy loading strategy may not be optimal for all current or newly defined requirements, especially for large size Java™ applications with complex business logic. This is because lazy loading strategy loads data into the application when they are accessed by utilizing the pointers. This requires additional communication with database server at background, which is time and resources consuming operation. When business logic of the application requires all related data and such data are marked as "lazy loaded data", there will be additional unnecessary communication at the background and delays in data processing as JPA implementation will have to wait for requested data.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the disclosure are directed to optimizing loading of relational data for applications. The relational data may include an entity, such as a business entity, and a relationship between the entity and other entities. The relationship may define the dependencies between the entities such that the entity may have one or more attributes that are also entities.

A plurality of requests are generated in an application server for selecting entities stored in a database and the processes to be executed for the selected entities. The database is located external to the application server. A plurality of application contexts for the entities stored in the database are provided by an application logic, which is also located external to the application server. An application context stored in the application logic is associated with each of the processes to be executed for the selected entities. The application context includes a process to be executed using the entity stored in the database. A fetch plan for lazy loading of the entity stored in the database is generated. The fetch plan is modified to eager loading of the entity stored in the database based on the selected entity and the associated application context.

Prior solutions for a fetch strategy of lazy loading of relational data for applications present several disadvantages. As discussed above, lazy loading strategy is a hint to the persistence provider runtime that the one or more entities can be fetched lazily in the database when the one or more entities are accessed for the first time. The lazy loading of the data requires fetching and loading the entity in the database and defer the loading of the attributes of the entity until a point at which they are desired. As such, additional communications with the database are made to fetch and load the attributes from the database. Such additional communications are time consuming and expensive from a server resource perspective, especially for large-size Java™ applications with complex business logic. Embodiments of the disclosure overcome these disadvantages by choosing the best fetch strategy for loading of the relational data from the database server and reducing additional communication with the database server.

Figure 1:
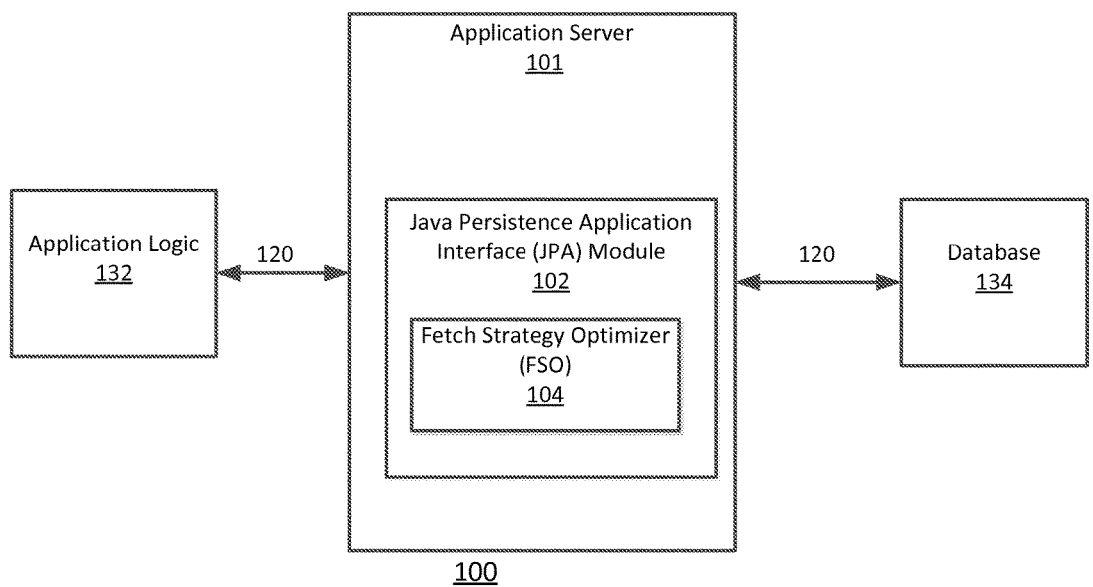
FIG. 1 is a block diagram of a computer architecture in which embodiments of the invention may operate.

FIG. 1 is a block diagram that illustrates a communications architecture 100 in which embodiments of the disclosure may operate. The communications architecture 100 includes an application server 101 that communicates with application logic 132 and a database 134. In one embodiment, the application server 101 may be any type of computing device including a laptop computer, a handheld computer, a netbook, a desktop, a workstation, a server device, a mainframe, or any other similar computing device. The application server 101 communicates with the database 134 and the application logic 132 via a connection 120. The connection 120 may be any type of connection including, but not limited to, a direct connection, local area network (LAN), a wide area network (WAN) (e.g., the Internet) or similar connection. The connection 120 can include any number of computing devices that are in communication over any combination of wired and wireless communication lines.

In one embodiment, the database 134 stores a plurality of entities. The entities may include business entities. In one embodiment, a relationship is defined between entities. The relationship may include the dependencies between the entities such that the entity may have one or more attributes corresponding to the entity. The attributes may include information about the entity, which may be another entity. For example, the entity may include an order entity and the attributes may include order items. In one embodiment, the relationship is defined by the user.

In one embodiment, the application logic 132 includes application context associated with the entities stored in the database 134. The application context may include [a] business data. In one embodiment, the application context includes a process to be executed using the entity and attributes of the entity that are stored in the database 134. The process to be executed may require the entity to be eagerly fetched. As an example discussed above, the entity may include an order entity and the attributes may include order items. Therefore, for example, a first process includes calculation of final sum of the order. As such, an eager loading strategy is selected to execute the first process since the first process requires the order entity and the corresponding attribute, the order items. As such, an eager loading strategy is selected to execute the first process since the first process requires the order entity and the corresponding attribute, the order items. As discussed above, in the eager loading strategy, the attributes of the entity are explicitly fetched and loaded from the database 134 when the entity is loaded. In another example, a second process is delivery of the order entity. As such, lazy loading strategy is selected to execute the second process, as the second process does not require the attribute, the order items. As discussed above, in the lazy loading strategy, the entity is loaded from the database 134 and the attributes are deferred of the entity are deferred from loading from the database 134. In one embodiment, the attributes of the entity are deferred from loading until they are accessed for a first time.

In one embodiment, the server 101 hosts a Java™ persistence application programming interface (JPA) module 102. The JPA module 102 functions to load the entities for a Java™ application. As previously discussed, there are two types of strategies for loading of the entities from the database 134. One such type of loading is lazy loading, which includes loading the entity from the database 134 and deferring loading of attributes of the entity from the database 134. In one embodiment, the attributes of the entity are deferred from loading until they are accessed for a first time. The other type of loading is eager loading in which attributes of the entity are explicitly fetched and loaded from the database 134 when the entity is loaded. The attributes of the entity are explicitly fetched without use of pointers to them. A user may select one of these strategies depending on requirements defined for the entity. Such requirements may be defined in the processes utilizing the entity and the attributes of the entity as described above.

In one embodiment, the JPA module 102 hosts a fetch strategy optimizer (FSO) 104. In one embodiment, the FSO 104 optimizes loading of entities for a Java™ application. In one embodiment, the JPA module 102 generates a plurality of requests selecting the entities stored in the database 134 and the processes to be executed for the selected entities. The requests may be sent by a user. In one embodiment, the user may select the entities based on the requirements defined for the entity. Such requirements may be defined in the processes utilizing the entity and the attributes of the entity as described above.

The FSO 104 monitors the requests and associates an application context for the entity in the application logic 132 with each of the processes to be executed for the selected entities in the request. As discussed above, the application context may include a current process utilizing the entity to execute the application such as the Java™ application. The FSO 104 retrieves information about the selected entity from the request and stores the information and the associated application context. In one embodiment, the information includes identification of the selected entity. For example, the identification is a name of the entity. In one embodiment, the FSO 104 determines that the fetch strategy for executing the current process in the associated application context is a lazy loading of the entity. In one embodiment, the FSO 104 automatically changes fetch strategy for the entity from lazy loading to eager loading strategy. As such, the FSO 104 dynamically optimizes loading of the relational data from the database 134, details of which are described herein below.

Figure 2:
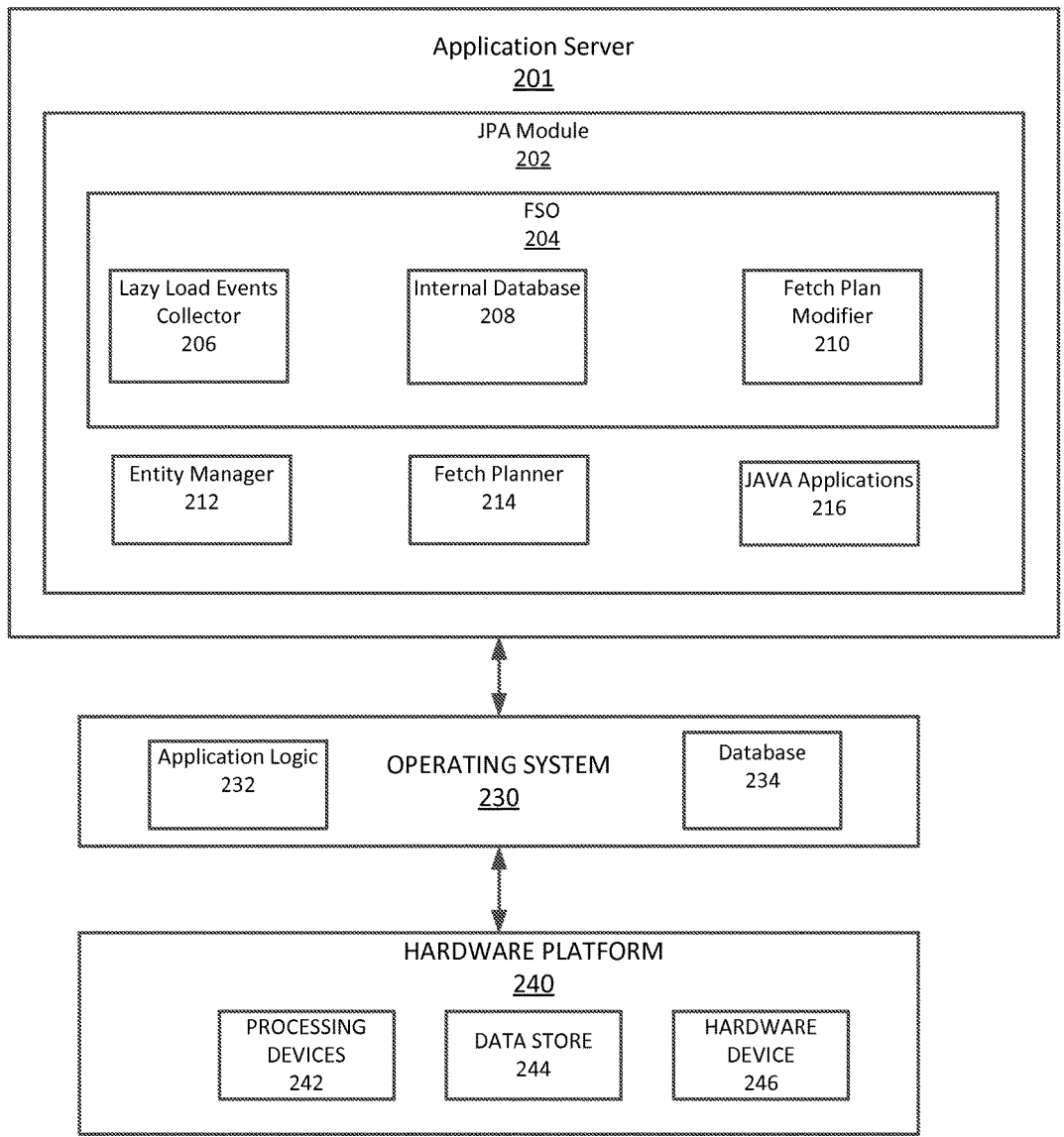
FIG. 2 is a block diagram of a computer system according to an embodiment of the invention.

FIG. 2 is a block diagram of a computer system 200 in which embodiments of the present invention may be implemented. In one embodiment, the computer system may be a machine such as, for example, any variety of user devices, such as a personal computer (PC), a laptop, a mobile phone, mobile smart phone, a tablet computer, handheld devices, netbooks, or any other computing device. Furthermore, computer system 200 may comprise a server device, such as a mainframe server device or any other type of server device. The computer system 200 comprises an application server 201, Java™ persistence application interface (JPA) server 202, and a hardware platform 240, on top of which runs an operating system (OS) 230. In one embodiment, the application server 201 is same the application server 102 described with respect to FIG. 1. The OS 230 may include Microsoft™, Linux™, Solaris™, Mac™ OS or any other suitable OS for managing operations on the computer system 200.

The hardware platform 240 may include one or more processing devices 242 and a data store 244. In one embodiment, the data store 244 comprises one or more hardware or software devices, which may be located internally or externally to the computer system 200. Examples of data store 244 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., PDS, DVD, BlueRay drives, etc.). In addition, hardware platform 240 may include additional hardware devices 246, such as network interface cards (NICs), sound or video adaptors, photo/video cameras, printer devices, keyboards, displays or any other suitable device intended to be coupled to a computer system.

The OS 230 may also include a database 234 storing the plurality of entities. In one embodiment, the database 234 is the same as the database 134 described with respect to FIG. 1. As discussed above, the entities may include business entities. In one embodiment, a relationship is defined between entities. The relationship may include the dependencies between the entities such that the entity may have one or more attributes corresponding to the entity. The attributes may include information about the entity, which may be another entity. For example, the entity may include an order entity and the attributes may include order items. In one embodiment, the relationship is defined by the user.

The OS 230 may include an application logic 232, which stores application context of the entity. In one embodiment, the application logic 232 is same the application logic 132 described with respect to FIG. 1. In one embodiment, the application logic 232 includes application context associated with the entities stored in the database 234. As discussed above, the application context may include a business data. In one embodiment, the application context includes a process to be executed using the entity and attributes of the entity that are stored in the database 234. The process to be executed may require the entity to be eagerly fetched. As an example discussed above, the entity may include an order entity and the attributes may include order items. Therefore, for example, a first process includes calculation of final sum of the order. As such, an eager loading strategy is selected to execute the first process since the first process requires the order entity and the corresponding attribute, the order items. As discussed above, in the eager loading strategy, the attributes of the entity are explicitly fetched and loaded from the database 234 when the entity is loaded. In another example, a second process is delivery of the order entity. As such, lazy loading strategy is selected to execute the second process, as the second process does not require the attribute, the order items. As discussed above, in the lazy loading strategy, the entity is loaded from the database 234 and the attributes are deferred of the entity are deferred from loading from the database 234. In one embodiment, the attributes of the entity are deferred from loading until they are accessed for a first time.

In one embodiment, the application server 201 may include a Java™ persistence application-programming interface (JPA) module 202. The JPA module 202 is same as the JPA module 102. The JPA module 202 may execute multiple Java™ applications 216. In some embodiments, the multiple Java™ applications 216 may be separate individual Java™ applications or multiple versions of the same Java™ application, or a combination of both. In one embodiment, the OS 230 executes an application server 201 that provides the individual or multiple Java™ applications. In some embodiments, the application server 201 may feature some specifications unique to Java™ platform for components. These specifications may include, but are not limited to, Enterprise Java™ Beans (EJB), Connectors, servlets, Java™ Server Pages and several web service technologies.

In one embodiment, the JPA module 202 includes an entity manager 212, a fetch planner 214 and a fetch strategy optimizer (FSO) 204. In one embodiment, the FSO 204 is same the FSO 104 described with respect to FIG. 1.

In one embodiment, the entity manager 212 serves as an interface for the JPA module 202 to receive and generate requests selecting the entities stored in the database 234 and the processes to be executed for the selected entities. The requests may be received from a user of the Java™ applications. The requests may be sent by a user. As discussed above, the entities may be selected based on the requirements defined for the entity. Such requirements may be defined in the processes utilizing the entity and the attributes of the entity as described above.

In one embodiment, the selected entity may include a first entity and a second entity, which includes attributes associated with the first entity. As an example, the first entity may include an order and the second entity may include an item associated with the order. In one embodiment, the fetch planner 214 generates fetch plans for each of the plurality of requests for lazy loading of the entities from the database 234. The fetch plan may include a lazy loading strategy. As such, the fetch plan includes fetching of the first entity for loading and deferral of loading of the attribute (i.e., the second entity).

In one embodiment, the FSO 204 includes a lazy loads event collector (LLEC) 206, an internal database 208 and a fetch plan modifier (FPM) 210. The LLEC 206 monitors the plurality of requests generated in the JPA module 202. As discussed above, the requests may select the entities stored in the database 234 and the processes to be executed for the selected entities. The LLEC 206 associates the application context in the application logic 232 with each of the processed to be executed for the selected identities. As discussed above, the application context may include a current process utilizing the entity to execute the application such as the Java™ application. The LLEC 206 retrieves information about the selected entities from the request and stores the information and the associated application context. In one embodiment, the information includes identification of the selected entity. For example, the identification is a name of the entity. In one embodiment, the information about the selected entity and the associated application context are stored in the internal database 208 located inside the JPA module 202 of the application server 201.

In one embodiment, the fetch planner 214 generates fetch plans for each of the application contexts in the application logic 232. As discussed above, the application contexts are current processes to be executed for the entities stored in the database 234. As such, the fetch planner generates fetch plans to search the entities from the database 234. In one embodiment, the current process may require the entity to be lazily fetched. As such, the fetch plan may include fetching the entity for loading and deferring loading of the attributes associated with the entity (which may be other entities). In one embodiment, the FPM 210 is invoked to examine the fetch plan generated by the fetch planner 214 for each of the current processes in the application context in the application logic 232. In one embodiment, FPM 210 compares information of the entity in the fetch plan with the information about each of the selected entries stored in the database 234. In one embodiment, identification of the entity in the fetch plan is compared with the stored information on the identity of the selected entity. In one embodiment, the FPM 210 compares the current application context in the application logic 232 with the associated application context stored in the database 234 when there is match between the entity in the fetch plan and the stored information on one of the selected entities.

In one embodiment, the FPM 210 automatically changes the fetch plan of lazy loading strategy generated by the fetch planner 214 to eager loading strategy when there is a match between the current application context in the application logic 232 with the associated application logic stored in the database 234. As such, the FPM 210 overrides the default fetching mechanism generated by the fetch planner 214. In one embodiment, the FSO 104 automatically changes fetch strategy for the entity from lazy loading to eager loading strategy using the stored associated application context. As such, the FSO 104 dynamically optimizes loading of the relational data from the database 134. Such optimization reduces further communication with the database 234 required for lazy loading of the data.

In one embodiment, the fetch planner 214 executes the eager loading strategy using the current application context in the application logic. As a result, the entity and attributes (i.e., other entities) associated with the selected entity are explicitly fetched and loaded from the database 234. In one embodiment, the selected entity is eagerly loaded from the database 234 during run time. Run time may refer to the time of execution of the Java™ application.

Figure 3:
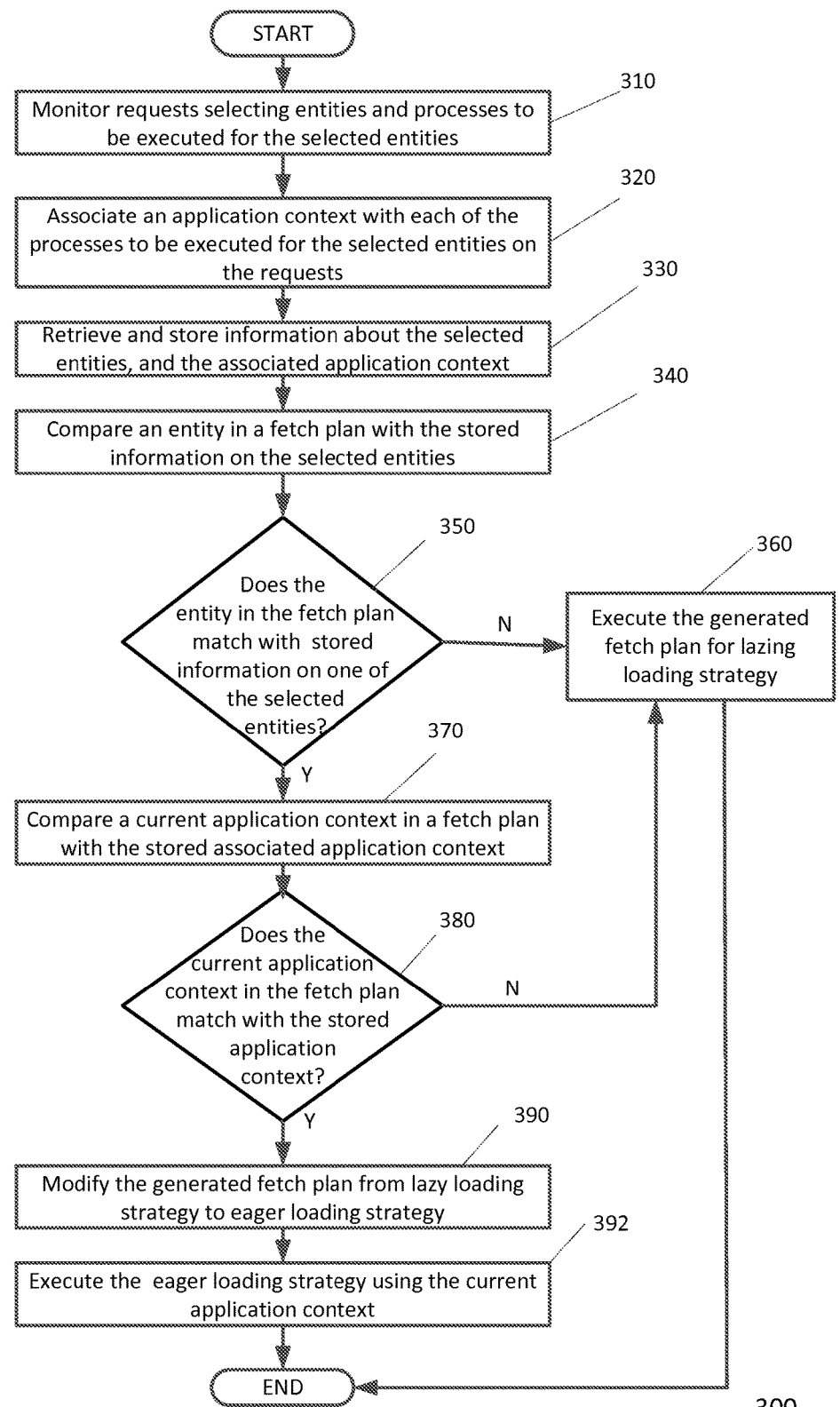
FIG. 3 is a flow diagram of one embodiment of a method for optimizing loading of relational data for Java™ applications.

FIG. 3 is a flow diagram illustrating a method 300 for optimizing loading of relational data according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the FSO 104 of FIG. 1 and/or FSO 204 of FIG. 2.

Method 300 begins at block 310, where requests selecting entities and processes to be executed for the selected entities are monitored. The requests may be generated inside an application server. In one embodiment, the application server hosts a JPA implementation for executing Java™ applications for loading of the entities. In one embodiment, the selected entities are stored in a database external to the application server hosting a JPA module, which hosts the FSO. In one embodiment, the process includes lazy loading of the entities from a database external to the application server. As discussed above, lazy loading may refer to a hint to a persistence provider runtime that one or more entities be fetched lazily when they are accessed for the first time. Also, as discussed above, lazy loading is commonly used to defer the loading of the attribute of the one or more entities until the point at which they are utilized. In one embodiment, each of the requests is monitored to be lazily fetched from an external database.

At block 320, associate an application context with each of the processes to be executed for the selected entities in the request. As discussed above, the application context may include a current process utilizing the entity to execute the application such as the Java™ application. At block 330, information about the selected entities in the request and the associated application context are retrieved and stored. As discussed above, the information includes identification of the selected entity. For example, the identification is a name of the entity. In one embodiment, the information about the entities and the associated application logic context are stored in a database located inside the JPA module of the application server.

At block 340, information of an entity in a fetch plan for lazy loading is compared with the stored information on the selected entities. In one embodiment, a fetch plan is generated in the JPA implantation for each of the application contexts in the application logic. Also, as discussed above, the application contexts are current processes to be executed for the entities stored in the external database. In one embodiment, the current process may require the entity to be lazily fetched. As such, the fetch plan may include fetching the entity for loading and deferring loading of the attributes associated with the entity (which may be other entities). At block 350, it is determined whether a match exists between the information of the entity in the fetch plan with the stored information on one of the selected entities. In on embodiment, the identity of the entity in the fetch plan is compared with the stored information on the identity of the selected entries. When it is determined at block 350 that the information of the entity in the fetch plan does not match with the stored information on any one of the selected entities, then at block 360, execute the generated fetch plan for lazing loading of the entity.

When it is determined at block 350 that the information of the entity in the fetch plan matches with the stored information on one of selected entities, then at block 370, the current application context in the fetch plan is compared to the stored associated application context. At block 380, it is determined whether a match exists between the current application context in the fetch plan with the stored application context. When it is determined at block 370 that the current application context in the fetch plan does not match with the stored application context, then the block 360 is repeated to execute the generated fetch plan for lazy loading of the entity. At block 390, the generated fetch plan is modified from lazy loading to eager loading of the entity when a match is determined at block 380 between the current application context in the fetch plan and the stored associated application context. In one embodiment, the fetch plan for the entity is automatically changed from lazy loading to eager loading strategy using the current application context. At block 392, the eager loading of the matched entity using the current application context is executed. In one embodiment, the eager loading strategy is executed during run time. The run time may be at the time of execution of the application such as the Java™ application. In one embodiment, the entity is eagerly loaded from the database external to the application server.

Figure 4:
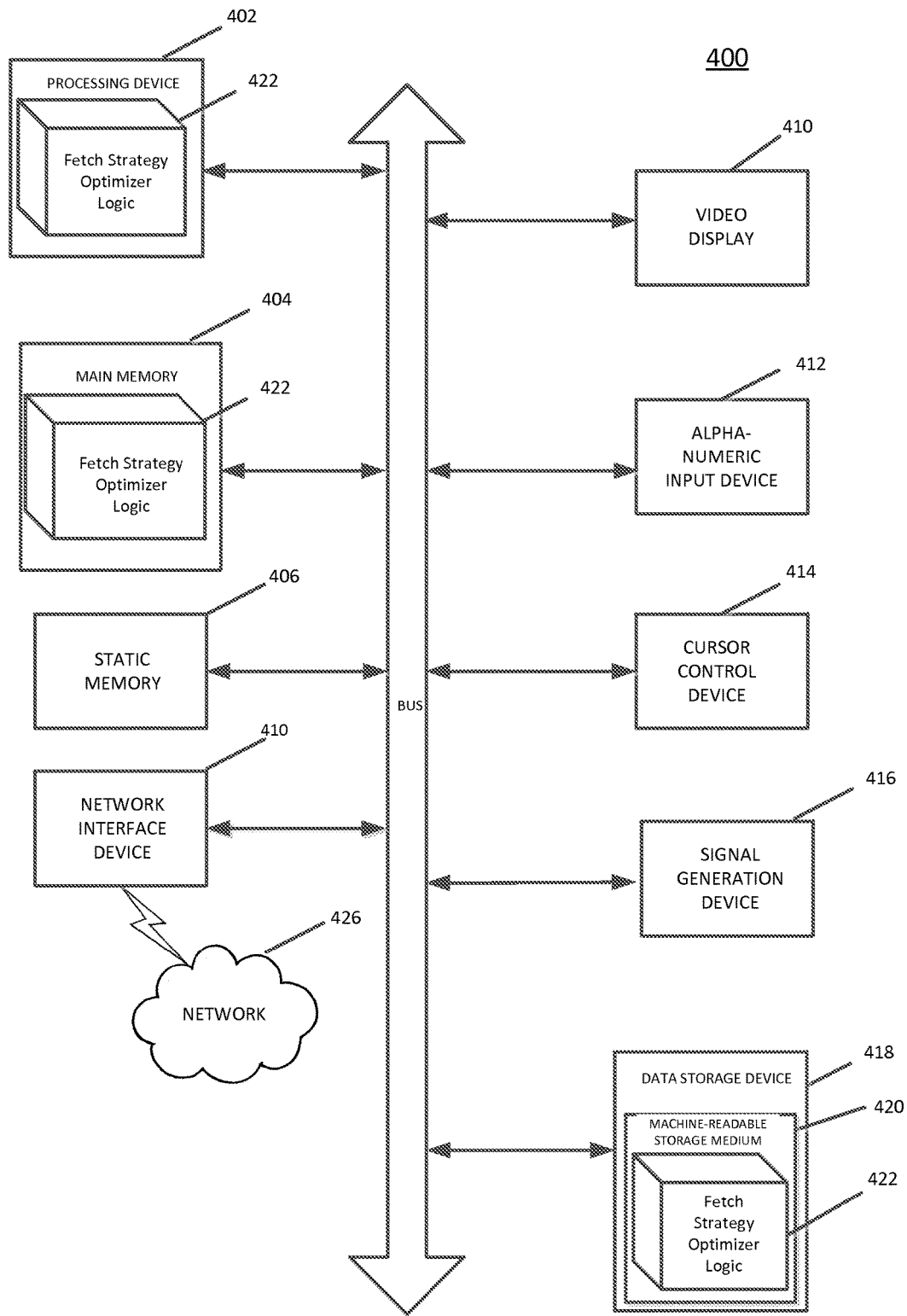
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 constituting machine-accessible storage media.

The machine-readable storage medium 424 may also be used to store instructions 426 to implement a fetch strategy optimizer to optimize loading of relational data for Java™ applications such as the fetch strategy optimizer (FSO) 204 described with respect to FIG. 2, and/or a software library containing methods that call the above applications. While the machine-accessible storage medium 424 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "associating", "modifying", "storing", "comparing", "executing", "changing", "retrieving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
monitoring, by a processing device, a plurality of requests selecting entities and processes to be executed for the selected entities, wherein the plurality of requests are generated in an application server;
storing, in a first database of the application server, information about the selected entities and a plurality of application contexts associated with the selected entities, wherein each of the plurality of application contexts comprises at least one of the processes to be executed for the selected entities, and wherein the information about the selected entities and the plurality of application contexts associated with the selected entities further comprises identification of the selected entities;

generating a fetch plan for a first entity stored in a second database external to the application server, wherein the fetch plan comprises a lazy loading of the first entity from the second database;

comparing identification of the first entity in the fetch plan with the stored identification of the selected entities;

determining, in view of the comparison, a match between a current application context in the fetch plan and at least one of the plurality of application contexts, wherein the current application context comprises a current process to be executed using the first entity; and modifying, by the processing device, the fetch plan in response to determining the match, wherein the modifying comprises changing the lazy loading of the first entity from the second database to eager loading of the first entity from the second database.

2. The method of claim 1, wherein the application server comprises a Java™ programming language application interface specification (JPA).

3. The method of claim 1, further comprising comparing the current application context in the fetch plan with the stored application contexts associated with the stored selected entities in response to a match between the identification of the stored selected entities with the identification of the first entity.

4. The method of claim 1, wherein the lazy loading comprises deferring loading of an attribute of the first entity in the second database until the attribute is desired to be accessed.

5. The method of claim 4, wherein the eager loading comprises explicitly fetching the attribute of the first entity.

6. The method of claim 1, wherein the selected entities comprise a second entity, the second entity comprising at least one attribute associated with the first entity.

7. The method of claim 6, wherein the fetch plan comprises fetching of the first entity for loading and deferral of loading of the second entity.

8. A system comprising:

a memory;

a processing device communicably coupled to the memory to:

monitor a plurality of requests selecting entities and processes to be executed for the selected entities, wherein the plurality of requests are generated in an application server;

store, in a first database of the application server, information about the selected entities and a plurality of application contexts, wherein each of the plurality of application contexts comprises at least one of the processes to be executed for the selected entities, and wherein the information about the selected entities and the plurality of application contexts associated with the selected entities further comprises identification of the selected entities;

generate a fetch plan for a first entity stored in a second database external to the application server, wherein the fetch plan comprises a lazy loading of the first entity from the second database;

compare identification of the first entity in the fetch plan with the stored identification of the selected entities;

determine, in view of the comparison, a match between a current application context in the fetch plan and at least one of the plurality of application contexts, wherein the current application context comprises a current process to be executed using the first entity; and modify the fetch plan in response to determining the match, wherein to modify the fetch plan, the processing device is further to change the lazy loading of the first entity from the second database to eager loading of the first entity from the second database.

9. The system of claim 8, wherein the application server comprises a Java™ programming language application interface specification (JPA).

10. The system of claim 8, wherein the processing device is further to:

compare the current application context in the fetch plan with the stored application contexts associated with the stored selected entities in response to a match between the identification of the stored selected entities with the identification of the first entity.

11. The system of claim 8, wherein the lazy loading comprises deferring loading of an attribute of the first entity in the second database until the attribute is desired to be accessed.

12. The system of claim 11, wherein the eager loading comprises explicitly fetching the attribute of the first entity.

13. The system of claim 8, wherein the selected entities comprise a second entity, the second entity comprising at least one attribute associated with the first entity.

14. The system of claim 13, wherein the fetch plan comprises fetching of the first entity for loading and deferral of loading of the second entity.

15. A non-transitory machine-readable storage medium including data that, when accessed by a processing device, cause the processing device to:

monitor a plurality of requests selecting entities and processes to be executed for the selected entities, wherein the plurality of requests are generated in an application server;

store, in a first database of the application server, information about the selected entities and a plurality of application contexts, wherein each of the plurality of application contexts comprises at least one of the processes to be executed for the selected entities, and wherein the information about the selected entities and the plurality of application contexts associated with the selected entities further comprises identification of the selected entities;

generate a fetch plan for a first entity stored in a second database external to the application server, wherein the fetch plan comprises a lazy loading of the first entity from the second database;

compare identification of the first entity in the fetch plan with the stored identification of the selected entities;

determine, in view of the comparison, a match between a current application context in the fetch plan and at least one of the plurality of application contexts, wherein the current application context comprises a current process to be executed using the first entity; and modify the fetch plan in response to determining the match, wherein to modify the fetch plan, the processing device is further to change the lazy loading of the first entity from the second database to eager loading of the first entity from the second database.

16. The non-transitory machine-readable storage medium of claim 15, wherein the application server comprises a Java™ programming language application interface specification (JPA).

17. The non-transitory machine-readable storage medium of claim 15, and wherein the lazy loading comprises deferring loading of an attribute of the first entity in the second database until the attribute is desired to be accessed.

18. The non-transitory machine-readable storage medium of claim 17, wherein the eager loading comprises explicitly fetching the attribute of the first entity.

19. The non-transitory machine-readable storage medium of claim 15, wherein the selected entities comprise a second entity, the second entity comprising at least one attribute associated with the first entity.

20. The non-transitory machine-readable storage medium of claim 19, wherein the fetch plan comprises fetching of the first entity for loading and deferral of loading of the second entity.

\* \* \* \* \*